March 16, 1965
C. R. PORTER
3,173,263
REMOTE CONTROL MECHANISM
Filed Oct. 3, 1962
2 Sheets-Sheet 1
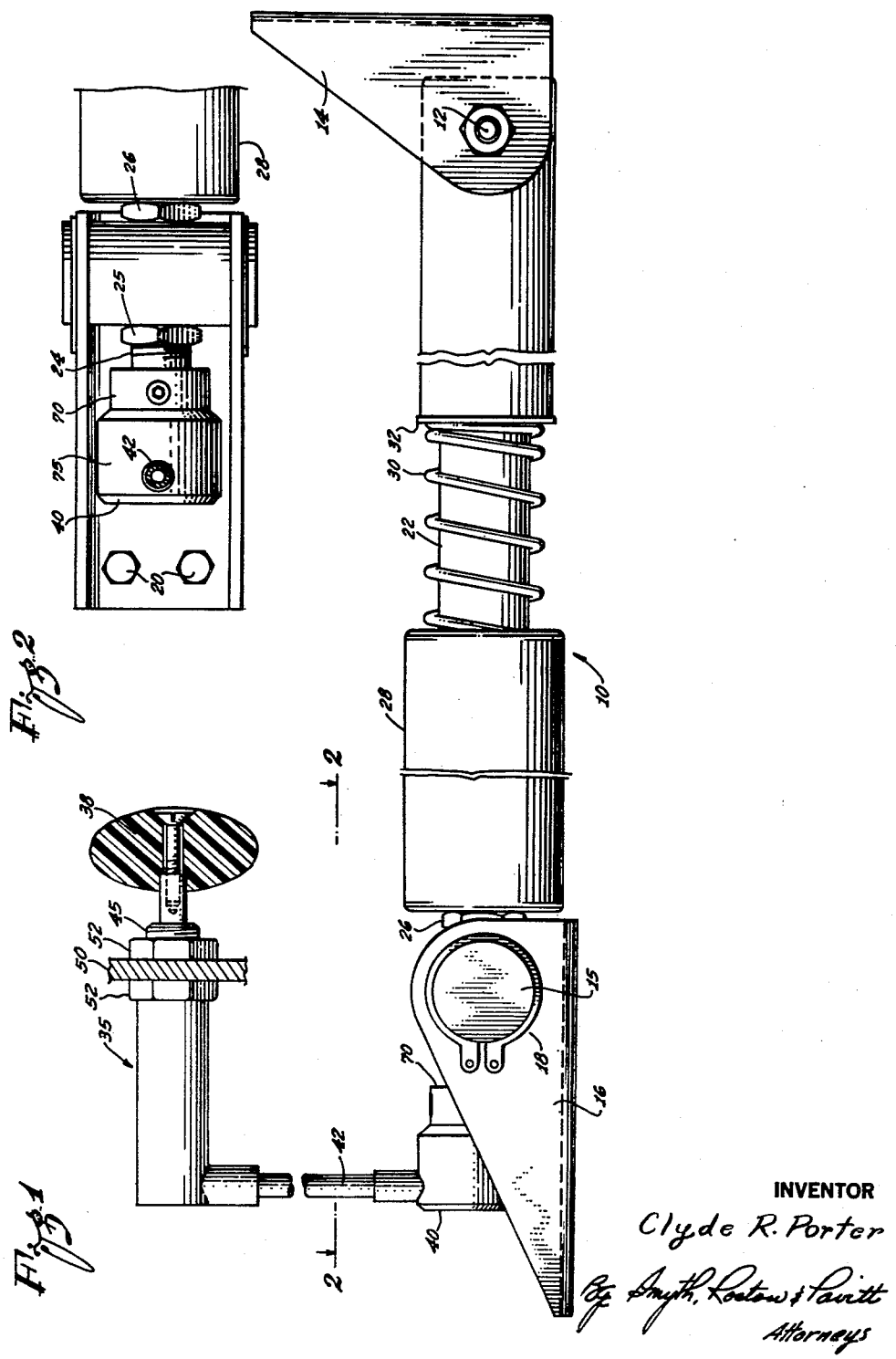
INVENTOR
Clyde R. Porter

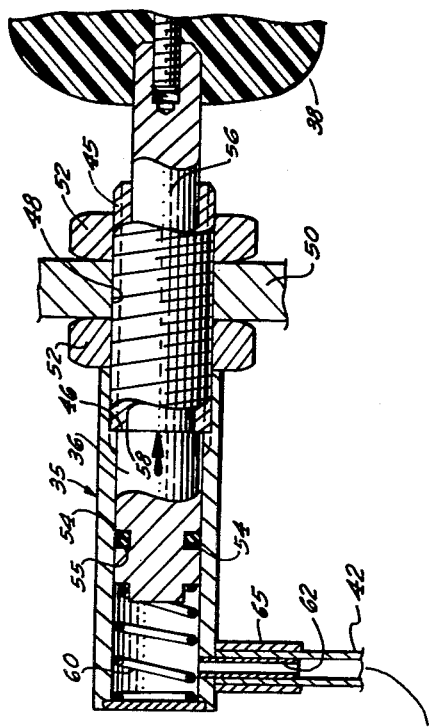

United States Patent Office 3,173,263
Patented Mar. 16, 1965

3,173,263
REMOTE CONTROL MECHANISM
Clyde R. Porter, Los Angeles, Calif., assignor to P. L. Porter & Associates, Los Angeles, Calif., a partnership
Filed Oct. 3, 1962, Ser. No. 228,105
3 Claims. (Cl. 60—54.5)

This invention relates to means for transmitting control force to a device from a remote station, and more particularly, is directed to a remote actuator of the hydraulic type.

The invention has many applications in various fields where a thrust stroke suffices to control, operate or trigger a device from a remote station. The invention has special utility, however, for releasing a hydraulic lock that normally immobilizes the back rest of an airplane seat at a selected angle of inclination. Such an embodiment of the invention has been selected for the present disclosure and will provide adequate guidance for those skilled in the art who may have occasion to apply the same concept for other specific purposes.

As disclosed, in the Porter Patent No. 2,922,497, for example, a well known type of hydraulic lock for an airplane seat comprises essentially a cylinder and a piston rod connected to a locking piston in the cylinder, this combination serving as a link of variable length. With one end of the variable link, either the cylinder end or the piston rod end, connected to the tiltable back rest and the other end connected to a fixed part of the seat structure, fluid flow in the cylinder between the two sides of the piston is normally cut off by a locking valve to immobilize the back rest. To adjust the inclination of the back rest, the occupant manipulates a suitable control to open a valve momentarily for fluid flow from one side of the piston to the other side and with the valve open manually changes the tilt of the back rest. Typically, the normally closed locking valve in the hydraulic lock is controlled by an operating rod which extends into the cylinder from one end axially thereof, the locking valve being opened by a slight longitudinal thrust of the operating rod.

In such an arrangement, the control force for opening the locking valve must be applied at one end of the cylinder but, unfortunately, this location is not conveniently accessible to the occupant of the seat. For this reason, various types of screw actuators, cam actuators and lever actuators have been employed for remote actuation of the control rod, in some instances in combination with some type of cable arrangement.

The present invention simplifies remote control by using a column of liquid in a small diameter flexible tube to transmit valve-opening thrust to the control rod from a conveniently located control station. In contrast to the usual remote control arrangement, the hydraulic system is free from complications and it is an exceedingly simple matter to route the flexible hydraulic tube from the control rod at the end of the cylinder to a manual control member mounted at any convenient point on the chair structure.

The hydraulic system uses a control chamber at the remote control station which is suitably adapted for manually operable change in its volume to cause fluid displacement throughout the length of the hydraulic tube. In the selected embodiment of the invention, a cylinder with a piston in the form of a plunger is used for this purpose, the plunger being shifted when desired by manual depression of a knob at the outer end of the plunger. The liquid that is displaced through the length of the tube by operation of the plunger acts against a diaphragm adjacent the hydraulic lock which flexes to apply operating thrust to the end of the valve-controlling rod.

A troublesome problem in the operation of such a hydraulic actuator is the tendency for bubbles to form in the hydraulic fluid when the volume of the control chamber at the remote control end of the fluid system is expanded after a liquid thrust has been exerted through the length of the confined hydraulic fluid. The rapid expansion movement of the released operating plunger lowers the fluid pressure and has a cavitation effect. A feature of the invention is that this problem is solved by maintaining the confined hydraulic fluid under spring pressure.

In the preferred practice of the invention the diaphragm at the actuating end of the confined liquid is in abutment with a rigid disk that serves to transmit the thrust from the diaphragm to the operating rod at the end of the hydraulic lock and at least one Belleville spring acts against this disk to urge the confined hydraulic liquid towards the control end of the system when the operating plunger at the control end is released. Thus the rigid disk serves the two purposes of transmitting force from the diaphragm to the operating rod when the remote control plunger is manually depressed and of transmitting return force from the Belleville washer means to the diaphragm when the remote control plunger is released. The rigid disk further serves to provide a surface of substantially the same area as the diaphragm to be placed under operating pressure, the relatively large surface resulting in an actuating force of ample magnitude.

The features and advantages of the invention may be understood from the following detailed description and the accompanying drawings.

In the drawings, which are to be considered as merely illustrative:

FIG. 1 is a view largely in side elevation and partly in section illustrating a selected embodiment of the invention wherein an operating knob adapted for manual depression controls a hydraulic lock for a tiltable airplane seat;

FIG. 2 is a fragmentary plan view of one end of the hydraulic lock with a portion of the hydraulic remote control system mounted thereon;

FIG. 3 is a sectional view of the remote control system in its normal idle state with the operating knob retracted; and FIG. 4 is a similar view with the operating knob advanced for unlocking the hydraulic lock control.

FIG. 1 shows a hydraulic lock structure, generally designated by numeral 10, which serves as an extensible link, one end of the link being connected by a pivot bolt 12 to a bracket 14 for attachment to the tiltable back rest (not shown) of an airplane seat, the second end being suitably adapted for connection to fixed structure of the airplane seat. In the construction shown, the second end of the hydraulic lock structure is connected to a cylindrical pivot means 15 that is journalled in a bracket 16 and retained in the bracket by a pair of snap rings 18. The bracket 16 is adapted for attachment to the fixed structure of the airplane seat by cap screws 20.

The hydraulic lock structure 10, which is of the general construction shown in the above-mentioned Porter patent, includes a hydraulic cylinder 22 which is connected to the pivot bolt 12 and includes a tubular piston rod 24 which is connected to a locking piston (not shown) in the hydraulic cylinder. The tubular piston rod 24 extends through the pivot means 15, the piston rod being externally screw-threaded and being anchored to the pivot means by a pair of opposed nuts 25 and 26. A cylindrical guard 28 is fixedly mounted on the piston rod 24 by means including the nut 26 and partially encloses a heavy coil spring 30 which surrounds the cylinder 22 under axial compression between the interior of the guard and a radial flange 32 of the cylinder.

As shown in FIG. 3 an operating rod 34 is slidingly mounted in the tubular piston rod 24 and normally protrudes beyond the piston rod by the indicated distance. A normally closed locking valve (not shown) inside the hydraulic cylinder 22 cuts off flow between the two sides of the concealed locking piston to immobilize the tiltable back rest, the locking valve being opened whenever the operating rod 34 is retracted to the position shown in FIG. 4.

The principal parts of the hydraulic system for remote actuation of the operating rod 34 include: a control cylinder 35 at the remote operating station; a movable wall in the form of a control piston 36 inside the control cylinder; a knob 38 for shifting the piston 36 against the confined hydraulic fluid; an operating chamber 40 at the operating end of the hydraulic lock structure 10; a flexible tube 42 interconnecting the control cylinder and the operating chamber; and a diaphragm 44 which constitutes a movable wall of the operating chamber and which creates the thrust for retracting the operating rod 34.

In the construction shown, the control cylinder 35 has a cylindrical extension 45 united therewith which is telescoped into the control cylinder proper to form an inner circumferential shoulder 46 for abutment by the control piston 36 at the normal idle position of the control piston. The cylindrical extension 45 is suitably mounted on fixed structure of the airplane seat within convenient reach of the seated occupant. In the construction shown, the cylindrical extension 45 is externally screw threaded and extends through a bore 48 of a fixed member 50 of the seat structure, the cylindrical extension being immobilized by a pair of opposed nuts 52.

The control piston 36 which carries an O-ring 54 in a circumferential groove 55 is an enlargement of a control plunger 56 that carries the operating knob 38, the enlargement forming a piston shoulder 58 for normal abutment against the inner circumferential shoulder 46. A suitable coil spring 60 confined under pressure in the control cylinder 35 continuously urges the control piston 36 towards its retracted position in abutment with the inner circumferential shoulder 46.

For interconnecting the control cylinder 35 and the operating chamber 40 by means of the flexible tube 42, the control cylinder is provided with a rigid nipple 62 and the operating chamber 40 is provided with a similar rigid nipple 64. One end of the flexible hose is telescoped over the nipple 62 and anchored thereon by a surrounding ferrule 65 and the other end telescopes over the nipple 64 and is secured thereon by a second ferrule 66.

The operating chamber 40 is mounted on a cylindrical block 70 which in turn is connected to the end of the tubular piston rod 24. In the construction shown in FIGS. 3 and 4, the cylindrical block 70 is telescoped over the end of the tubular piston rod 24 in a fluid-tight manner and is further anchored thereto by a set screw 72 which seats in a peripheral recess 74 of the piston rod. The operating chamber 40 may be mounted on the cylindrical block 70 in any suitable manner. For this purpose the operating chamber 40 may be constructed as shown with a cylindrical skirt 75 that embraces the cylindrical block and is turned radially inward for positive engagement with an outer circumferential shoulder 76 of the cylindrical block.

The diaphragm 44 may be made of elastomeric material and may be formed with a circumferential bead 78 of the character of an O-ring which not only anchors the periphery of the diaphragm but also serves as sealing ring between the operating chamber 40 and the cylindrical block 70. The hydraulic system should be provided with a suitable normally closed bleeder port for release of trapped air when the system is first filled with hydraulic liquid. For this purpose the control chamber may be provided with a bleeder port in the form of a tapped bore 80 that is normally sealed by a screw 82 carrying a sealing ring 84.

In this particular embodiment of the invention it is contemplated that the diaphragm 44 will be normally backed against a tapered inner circumferential shoulder 85 of the operating chamber by the pressure of a rigid metal disk 86 which has a correspondingly tapered circumferential shoulder 88. The disk 86 normally holds the diaphragm 44 against the tapered shoulder 85 under the pressure exerted by at least one Belleville spring. In the construction shown, a pack of four Belleville springs is mounted inside the cylindrical block 70 under compression between the rigid disk 86 and an inner circumferential shoulder 92 of the cylindrical block 70. It is to be noted that the diaphragm 44 divides the operating chamber 40 into a first compartment that houses the Belleville springs and a second compartment that is in hydraulic communication with the remote control chamber.

The manner in which the invention functions for its purpose may be readily understood from the foregoing description. Normally the four Belleville springs 90 which surround the protruding end of the operating rod 34 hold the rigid disk 86 at its limit position with the disk holding the diaphragm 44 against the tapered shoulder 85 of the operating chamber 40. Sufficient hydraulic liquid is confined in the control cylinder 35, the flexible tube 42 and the operating chamber 40 to keep the operating piston 36 backed against the inner circumferential shoulder 46 of the control cylinder 35.

When the occupant of the seat pushes on the operating knob 38 to press the operating plunger 56 inwardly, the consequent movement of the operating piston 36 to the left as viewed in FIG. 3 causes displacement of the confined hydraulic liquid against the diaphragm 44 in the operating chamber 40 with the consequence that the diaphragm flexes to the right as shown in FIG. 4. The rightward flexure of the diaphragm 44 moves the rigid disk 86 rightward with corresponding compression of the Belleville springs 90 and corresponding rightward shift of the operating rod 34 to free the back rest for change in the inclination.

When the occupant of the seat changes the inclination of the back rest as desired, the operating knob 38 is released. The release of the operating knob 38 permits return displacement of the hydraulic fluid in the system in response to the pressure of the Belleville springs 90. The return displacement of the hydraulic fluid assisted by the coil spring 60 returns the piston 36 to its normal position of abutment against the inner circumferential shoulder 46 of the control cylinder. The operating rod 34 is returned to its normal position by the usual spring means (not shown) inside the hydraulic lock structure 10.

It is apparent that the invention meets certain requirements that are peculiar to a hydraulically locked reclining chair. In the first place space is limited in the region of the protruding end of the operating rod 34 where the hydraulic locking cylinder is incorporated in the construction of the chair within the space defined by the chair structure. Consequently the operating chamber 40 must be extremely short in axial dimension.

In the second place, only a short axial thrust is required to release the hydraulic lock. In the third place, the hydraulic lock is sensitive with respect to movement of the operating rod and consequently reliability may be achieved only by making provision for positive retraction of the disk 86 when manual pressure on the operating knob 38 is terminated.

My description in specific detail of the selected embodiment of the invention will suggest various changes, substitutions and other departures from my disclosure within the spirit and scope of the appended claims.

I claim:

1. Remotely operable means to actuate a control member of a device, for example a release member that has a short release stroke and protrudes from one end of a device in the form of a hydraulic lock of a reclining chair, wherein one requirement is reliability and a second requirement is compactness to conform to the limited space available at the end of the device, said remotely operable means comprising:

means cooperative with said end of the device to form therewith an operating chamber enclosing the protruding end of the operating member;

a diaphragm spanning said chamber and dividing the chamber into a first compartment and a second compartment, the first compartment enclosing the end of the operating member;

a disk in said first compartment with one face of the disk abutting the diaphragm and the other face abutting the end of the operating member;

a plurality of Belleville springs surrounding the protruding end of the operating member under continuous axial compression between the disk and the end of the device to yieldingly space the disk from the end of the device;

stop means to limit the movement of the disk away from the end of the device by the pressure of the Belleville springs to keep the springs constantly compressed;

a control chamber of substantially smaller cross section than the second compartment at a location remote from the operating chamber, said control chamber having a normal volume and being manually operable for reduction in volume; and fluid passage means connecting the control chamber with said second compartment and cooperative with the control chamber and the second compartment to confine a body of liquid to apply operative pressure against the diaphragm to shift the disk against the operating member in response to manual reduction in the volume of the control chamber.

2. A combination as set forth in claim 1 in which the stop means is in said second compartment in abutment with the diaphragm.

3. A combination as set forth in claim 1 in which the control chamber comprises a cylinder and a plunger extending into the cylinder for manual operation to reduce the effective volume of the control chamber; and in which a coil spring is confined in said cylinder to yieldingly urge retraction of the plunger to restore the control chamber to its normal effective volume.

References Cited in the file of this patent

UNITED STATES PATENTS

| | | |
|---|---|---|
| 1,808,346 | Finsen | June 2, 1931 |
| 2,185,277 | Stelzer | Jan. 2, 1940 |
| 2,592,221 | Whitted | Apr. 8, 1952 |
| 2,673,038 | Vernet et al. | Mar. 23, 1954 |
| 2,733,572 | Butterfield et al. | Feb. 7, 1956 |
| 2,930,606 | Trumper | Mar. 27, 1957 |
| 2,966,328 | Burnworth | Dec. 27, 1960 |